March 15, 1966   H. G. ROMBERG ETAL   3,240,172
CHARCOAL BRIQUET STARTER AND SAVER
Filed June 17, 1964
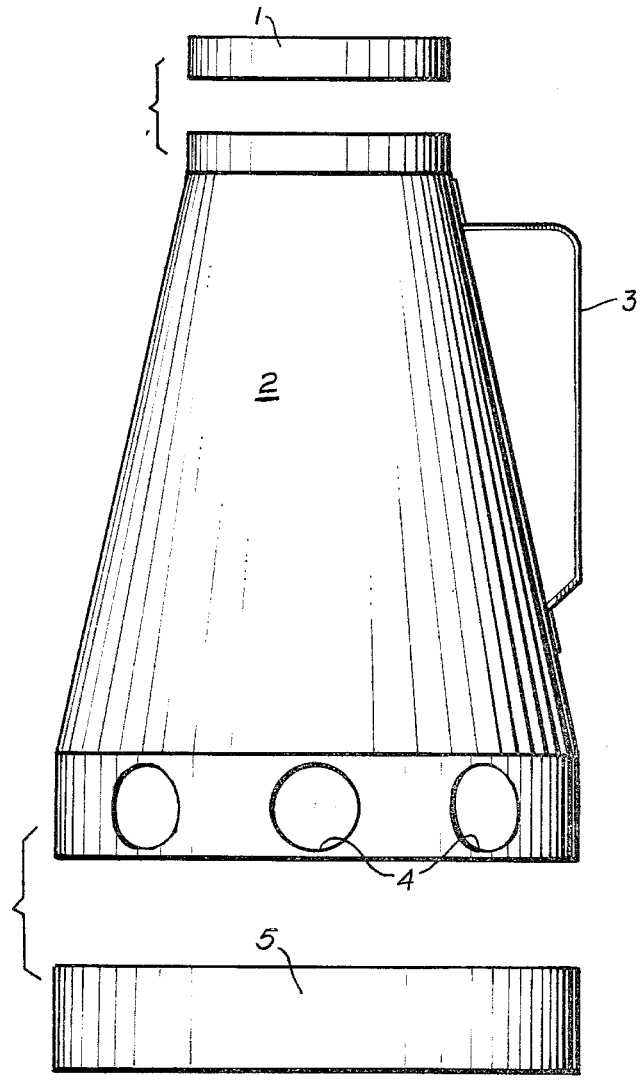
Harland G. Romberg
Mary Jo Romberg
Inventors

United States Patent Office 3,240,172
Patented Mar. 15, 1966

3,240,172
CHARCOAL BRIQUET STARTER AND SAVER
Harland G. Romberg and Mary Jo Romberg, both of
595 Briarwood Terrace, Ventura, Calif.
Filed June 17, 1964, Ser. No. 375,816
1 Claim. (Cl. 110—1)

Brief summary of invention

Invention consists of the "starter" which is a sheet metal cone shaped tube with the top end of the cone removed. The cone has a cylinder base containing air vents and a metal handle along a side. The 'Saver' is the "starter" with snug fitting covers which when in place make an air tight compartment in which the hot briquets have been placed. The briquets extinguish for lack of oxygen.

The figure shows an exploded elevation view of the invention.

Detailed description

The entire "charcoal briquete-saver" is made from sheet metal stock of appropriate gage, the invention consists of:
The top cap 1, the body 2, the handle 3, the vent holes 4, and the bottom cap 5.

The body 2, is a cylinder of varying degree of angle of a side to the perpendicular and is of varying height. Vent holes 4, are spaced around the body at the larger end which is the bottom end. A handle 3, of sheet metal is attached to the body for convenience in handling.

The top cap 1, consists of a cylinder with one end closed and shall fit snugly over the small end (top) of the body.

The bottom cap 5, consists of a cylinder with the lower end closed and shall have an upstanding flange of sufficient height so it may cover the large end (bottom) of the body and the vent holes.

To use the starter, place it in a barbeque and fill to not more than two thirds with briquets. Use starter fuel and ignite. When the briquets are burning to suit lift the starter by the handle leaving the hot briquets to spread out in the barbecue.

When the barbecue is over place the bottom cap 5, on the large end of the starter body 2, which now becomes the saver. Wearing gloves and using tongs on shovel, place the remaining briquets in the saver and cover with the top cap 1.

When the caps are both in place the entrance of air is stopped and the briquets extinguish for lack of oxygen. A complete seal is not to be obtained as this would cause the container to collapse as the cooling occurred.

We claim:

A convertible burner and charcoal saver unit comprising a cylinder formed of a piece of sheet metal open at the top and bottom and being imperforated except that the same is provided with a series of holes circling the bottom end of the cylinder, a cap means for closing off the top opening and a cap means provided with an upstanding flange to close off the bottom opening and said series of holes whereby the unit is adapted to facilitate the ignition of charcoal for a grill with the two caps removed from said openings and, when cooking on the barbecue has been completed, to smother the burning fuel and save same for re-use by placing the lower cap on the unit, then placing the fuel in the unit, and finally covering with the top cap.

References Cited by the Examiner

UNITED STATES PATENTS

| | | | |
|---|---|---|---|
| 1,713,659 | 5/1929 | Karr | 126—59.5 |
| 1,969,506 | 8/1934 | Frey | 126—59.5 |
| 3,167,040 | 1/1965 | Byars et al. | 110—1 |
| 3,168,062 | 2/1965 | Arnold | 110—1 |

FREDERICK KETTERER, *Primary Examiner.*